United States Patent
Damm et al.

(10) Patent No.: US 12,392,231 B2
(45) Date of Patent: Aug. 19, 2025

(54) CONTROL OF AN IMPELLER CLUTCH OF A TORQUE CONVERTER FOR A GASEOUS FUEL ENGINE

(71) Applicant: Caterpillar Inc., Peoria, IL (US)

(72) Inventors: Shawn M. Damm, Houston, TX (US); Rodney D. Harms, Houston, TX (US); Todd Ryan Kabrich, Tomball, TX (US); Yuesheng He, Sugar Land, TX (US); Sri Harsha Uddanda, Cypress, TX (US)

(73) Assignee: Caterpillar Inc., Peoria, IL (US)

( * ) Notice: Subject to any disclaimer, the term of this patent is extended or adjusted under 35 U.S.C. 154(b) by 177 days.

(21) Appl. No.: 18/329,286

(22) Filed: Jun. 5, 2023

(65) Prior Publication Data

US 2024/0401453 A1 Dec. 5, 2024

(51) Int. Cl.
| | |
|---|---|
| *F16H 45/02* | (2006.01) |
| *E21B 43/26* | (2006.01) |
| *F04B 17/05* | (2006.01) |
| *F16H 61/14* | (2006.01) |
| *F16H 45/00* | (2006.01) |

(52) U.S. Cl.
CPC .......... *E21B 43/2607* (2020.05); *F04B 17/05* (2013.01); *F16H 45/02* (2013.01); *F16H 61/143* (2013.01); *F16H 2045/002* (2013.01); *F16H 2045/005* (2013.01)

(58) Field of Classification Search
CPC .. F16H 45/02; F16H 2045/002; F16H 37/022; F16H 37/042; F04B 17/05
See application file for complete search history.

(56) References Cited

U.S. PATENT DOCUMENTS

| | | | |
|---|---|---|---|
| 5,509,520 A * | 4/1996 | Evans | F16H 61/143 192/3.3 |
| 9,121,484 B2 | 9/2015 | Gibbs et al. | |
| 9,360,056 B2 | 6/2016 | Long | |
| 9,366,114 B2 | 6/2016 | Coli et al. | |
| 9,840,897 B2 | 12/2017 | Larson | |
| 10,502,042 B2 | 12/2019 | Coli et al. | |
| 11,384,629 B2 * | 7/2022 | Reddy | F04B 49/06 |
| 11,408,262 B2 | 8/2022 | Reckels et al. | |
| 2010/0056330 A1 | 3/2010 | Schuh | |

(Continued)

FOREIGN PATENT DOCUMENTS

| | | | | |
|---|---|---|---|---|
| CN | 1768219 A * | 5/2006 | | B60W 30/00 |
| CN | 205036365 U | 2/2016 | | |
| CN | 213869837 U | 8/2021 | | |

*Primary Examiner* — Stacey A Fluhart

(57) ABSTRACT

A hydraulic fracturing pump system may include a hydraulic fracturing pump, a gaseous fuel engine configured to drive the hydraulic fracturing pump, and a transmission system including a gear system mechanically coupled to the hydraulic fracturing pump and torque converter configured to fluidly couple the gaseous fuel engine and the gear system. The torque converter may include an impeller, a turbine fluidly coupled to the impeller and mechanically coupled to the gear system, a stator positioned between the impeller and the turbine, an impeller clutch configured to mechanically couple the impeller to the gaseous fuel engine, and a lockup clutch configured to mechanically couple the gaseous fuel engine and the gear system.

20 Claims, 3 Drawing Sheets

(56) References Cited

U.S. PATENT DOCUMENTS

| | | | |
|---|---|---|---|
| 2011/0121692 A1* | 5/2011 | Iwase | B60L 50/16 |
| | | | 192/85.01 |
| 2011/0139562 A1* | 6/2011 | Nakamura | F16H 41/30 |
| | | | 192/3.21 |
| 2022/0275794 A1 | 9/2022 | Tauber | |
| 2022/0290545 A1* | 9/2022 | Bayyouk | F04B 11/0008 |
| 2023/0258172 A1* | 8/2023 | Clark | F04B 49/20 |
| | | | 417/43 |
| 2023/0340866 A1* | 10/2023 | Aune | F04B 17/03 |

* cited by examiner

CONTROL OF AN IMPELLER CLUTCH OF A TORQUE CONVERTER FOR A GASEOUS FUEL ENGINE

TECHNICAL FIELD

The present disclosure relates generally to torque converters and, for example, to control of an impeller clutch of a torque converter for a gaseous fuel engine.

BACKGROUND

Hydraulic fracturing is a well stimulation technique that typically involves pumping hydraulic fracturing fluid into a wellbore at a rate and a pressure (e.g., up to 15,000 pounds per square inch (psi)) sufficient to form fractures in a rock formation surrounding the wellbore. This well stimulation technique often enhances the natural fracturing of a rock formation to increase the permeability of the rock formation, thereby improving recovery of water, oil, natural gas, and/or other fluids. A hydraulic fracturing pump (or a "well stimulation pump") may be powered by a diesel engine or a diesel/natural gas dual-fuel engine (e.g., a dynamic gas blending (DGB) engine), which are capable of handling high load rise rates. However, diesel engines and diesel/natural gas dual-fuel engines are associated with high levels of greenhouse gas emissions and high fuel costs.

Gaseous fuels, such as natural gas, may be less expensive than other hydrocarbon fuels, more readily available in remote areas, and may burn relatively cleaner during operation. A typical gaseous fuel internal combustion engine differs from a traditional, liquid fuel internal combustion engine primarily in that a gaseous fuel (e.g., methane, natural gas, ethane, and/or propane) is burned in the engine rather than an atomized mist of liquid fuel from a fuel injector or carburetor. Most gaseous fuel engines operate using spark ignition by a conventional spark plug. While gaseous fuel engines have a number of benefits, gaseous fuel engines are typically associated with poor load acceptance or otherwise poor response to changes in load. This is because a gaseous fuel engine may be associated with a relatively long path between cylinders of the engine and a fuel inlet to the engine, and it may take several seconds before a volume of gaseous fuel in the engine can be adjusted to a new level. Accordingly, a gaseous fuel engine generally has been considered unsuitable for driving a hydraulic fracturing pump because of the high load rise rates associated with hydraulic fracturing operations due to gear shifts or due to a hydraulic fracturing pump being brought online in the middle of a fracturing stage.

The torque converter of the present disclosure solves one or more of the problems set forth above and/or other problems in the art.

SUMMARY

A hydraulic fracturing pump system may include a hydraulic fracturing pump, a gaseous fuel engine configured to drive the hydraulic fracturing pump, and a transmission system including a gear system mechanically coupled to the hydraulic fracturing pump and a torque converter configured to fluidly couple the gaseous fuel engine and the gear system. The torque converter may include an impeller, a turbine fluidly coupled to the impeller and mechanically coupled to the gear system, a stator positioned between the impeller and the turbine, an impeller clutch configured to mechanically couple the impeller to the gaseous fuel engine, and a lockup clutch configured to mechanically couple the gaseous fuel engine and the gear system.

A transmission system may include a gear system configured to couple to a hydraulic fracturing pump and a torque converter configured to fluidly couple a gaseous fuel engine and the gear system. The torque converter may include an impeller; a turbine fluidly coupled to the impeller and mechanically coupled to the gear system, a stator positioned between the impeller and the turbine, an impeller clutch configured to mechanically couple the impeller to the gaseous fuel engine, and a lockup clutch configured to mechanically couple the gaseous fuel engine and the gear system.

A torque converter to fluidly couple a gaseous fuel engine and a gear system mechanically coupled to a hydraulic fracturing pump may include an impeller, a turbine fluidly coupled to the impeller, a stator positioned between the impeller and the turbine, an impeller clutch configured to couple the impeller to the gaseous fuel engine, and a lockup clutch configured to mechanically couple the gaseous fuel engine and the gear system.

DETAILED DESCRIPTION

Figure 1:
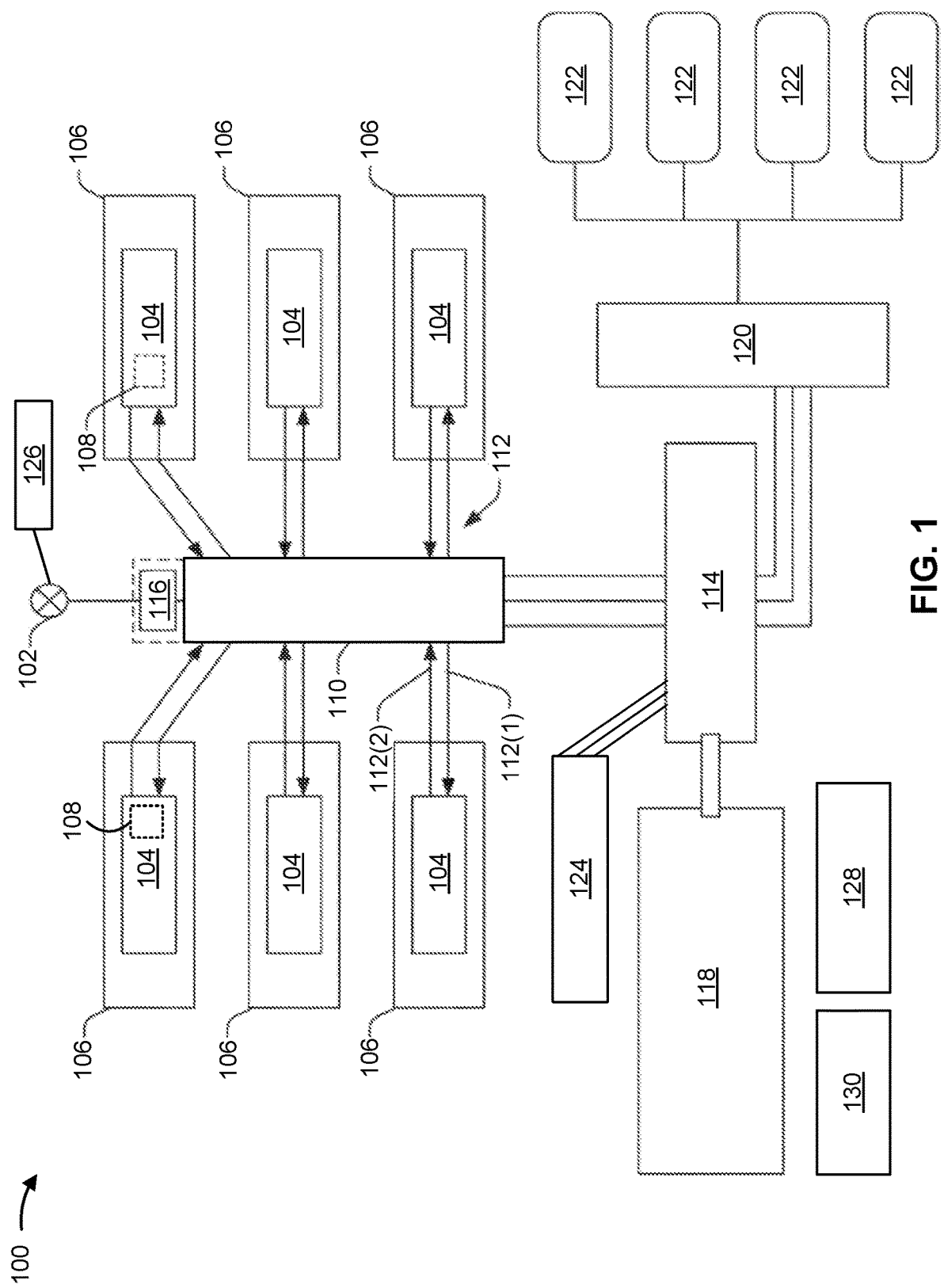
FIG. 1 is a diagram illustrating an example hydraulic fracturing system.

FIG. 1 is a diagram illustrating an example hydraulic fracturing system 100. For example, FIG. 1 depicts a plan view of an example hydraulic fracturing site along with equipment that is used during a hydraulic fracturing process. In some examples, less equipment, additional equipment, or alternative equipment to the example equipment depicted in FIG. 1 may be used to conduct the hydraulic fracturing process.

The hydraulic fracturing system 100 includes a well 102. Hydraulic fracturing is a well-stimulation technique that uses high-pressure injection of fracturing fluid into the well 102 and corresponding wellbore in order to hydraulically fracture a rock formation surrounding the wellbore. While the description provided herein describes hydraulic fracturing in the context of wellbore stimulation for oil and gas production, the description herein is also applicable to other uses of hydraulic fracturing.

High-pressure injection of the fracturing fluid may be achieved by one or more pump systems 104 (e.g., hydraulic fracturing pump systems) that may be mounted (or housed) on one or more hydraulic fracturing trailers 106 (which also may be referred to as "hydraulic fracturing rigs") of the hydraulic fracturing system 100. Each of the pump systems 104 includes at least one fluid pump 108 (referred to herein collectively, as "fluid pumps 108" and individually as "a fluid pump 108"). The fluid pumps 108 may be hydraulic fracturing pumps. The fluid pumps 108 may include various types of high-volume hydraulic fracturing pumps, such as triplex or quintuplex pumps. Additionally, or alternatively, the fluid pumps 108 may include other types of reciprocating positive-displacement pumps or gear pumps. A type and/or a configuration of the fluid pumps 108 may vary depending on the fracture gradient of the rock formation that will be hydraulically fractured, the quantity of fluid pumps 108 used in the hydraulic fracturing system 100, the flow rate necessary to complete the hydraulic fracture, the pressure necessary to complete the hydraulic fracture, or the like. The hydraulic fracturing system 100 may include any number of trailers 106 having fluid pumps 108 thereon in order to pump hydraulic fracturing fluid at a predetermined rate and pressure.

In some examples, the fluid pumps 108 may be in fluid communication with a manifold 110 via various fluid conduits 112, such as flow lines, pipes, or other types of fluid conduits. The manifold 110 combines fracturing fluid received from the fluid pumps 108 prior to injecting the fracturing fluid into the well 102. The manifold 110 also distributes fracturing fluid to the fluid pumps 108 that the manifold 110 receives from a blender 114 of the hydraulic fracturing system 100. In some examples, the various fluids are transferred between the various components of the hydraulic fracturing system 100 via the fluid conduits 112. The fluid conduits 112 include low-pressure fluid conduits 112(1) and high-pressure fluid conduits 112(2). In some examples, the low-pressure fluid conduits 112(1) deliver fracturing fluid from the manifold 110 to the fluid pumps 108, and the high-pressure fluid conduits 112(2) transfer high-pressure fracturing fluid from the fluid pumps 108 to the manifold 110.

The manifold 110 also includes a fracturing head 116. The fracturing head 116 may be included on a same support structure as the manifold 110. The fracturing head 116 receives fracturing fluid from the manifold 110 and delivers the fracturing fluid to the well 102 (via a well head mounted on the well 102) during a hydraulic fracturing process. In some examples, the fracturing head 116 may be fluidly connected to multiple wells.

The blender 114 combines proppant received from a proppant storage unit 118 with fluid received from a hydration unit 120 of the hydraulic fracturing system 100. In some examples, the proppant storage unit 118 may include a dump truck, a truck with a trailer, one or more silos, or other types of containers. The hydration unit 120 receives water from one or more water tanks 122. In some examples, the hydraulic fracturing system 100 may receive water from water pits, water trucks, water lines, and/or any other suitable source of water. The hydration unit 120 may include one or more tanks, pumps, gates, or the like.

The hydration unit 120 may add fluid additives, such as polymers or other chemical additives, to the water. Such additives may increase the viscosity of the fracturing fluid prior to mixing the fluid with proppant in the blender 114. The additives may also modify a pH of the fracturing fluid to an appropriate level for injection into a targeted formation surrounding the wellbore. Additionally, or alternatively, the hydraulic fracturing system 100 may include one or more fluid additive storage units 124 that store fluid additives. The fluid additive storage unit 124 may be in fluid communication with the hydration unit 120 and/or the blender 114 to add fluid additives to the fracturing fluid.

In some examples, the hydraulic fracturing system 100 may include a balancing pump 126. The balancing pump 126 provides balancing of a differential pressure in an annulus of the well 102. The hydraulic fracturing system 100 may include a data monitoring system 128. The data monitoring system 128 may manage and/or monitor the hydraulic fracturing process performed by the hydraulic fracturing system 100 and the equipment used in the process. In some examples, the management and/or monitoring operations may be performed from multiple locations. The data monitoring system 128 may be supported on a van, a truck, or may be otherwise mobile. The data monitoring system 128 may include a display for displaying data for monitoring performance and/or optimizing operation of the hydraulic fracturing system 100. In some examples, the data gathered by the data monitoring system 128 may be sent off-board or off-site for monitoring performance and/or performing calculations relative to the hydraulic fracturing system 100.

The hydraulic fracturing system 100 includes a controller 130. The controller 130 may be a system-wide controller for the hydraulic fracturing system 100 or a pump-specific controller for a pump system 104. The controller 130 may be communicatively coupled (e.g., by a wired connection or a wireless connection) with one or more of the pump systems 104. The controller 130 may also be communicatively coupled with other equipment and/or systems of the hydraulic fracturing system 100.

As indicated above, FIG. 1 is provided as an example. Other examples may differ from what is described with regard to FIG. 1.

Figure 2:
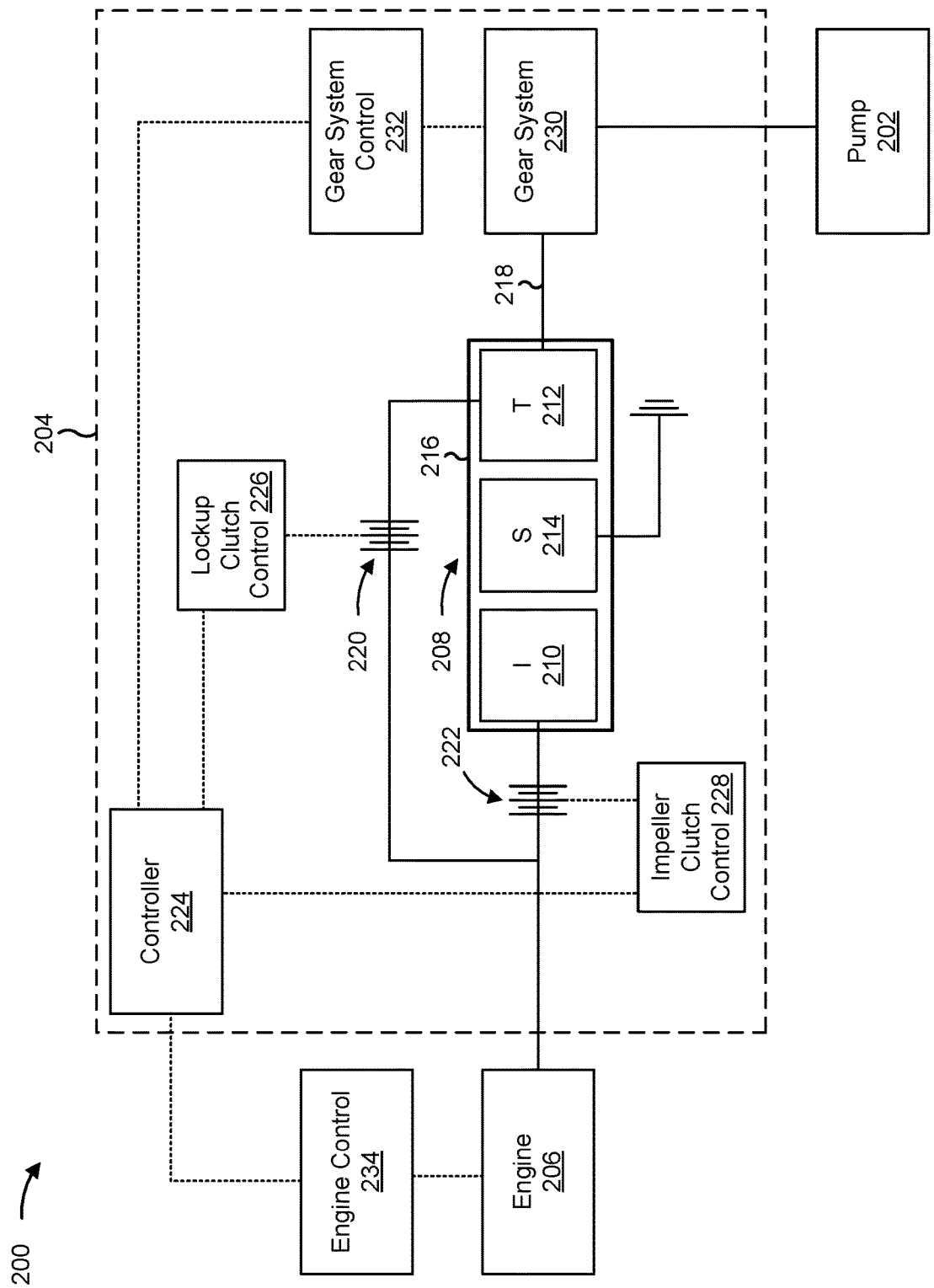
FIG. 2 is a diagram illustrating an example pump system.

FIG. 2 is a diagram illustrating an example pump system 200. The pump system 200 may correspond to a pump system 104, described herein. The pump system 200 includes a powertrain that includes a pump 202, a transmission system 204, and an engine 206. The transmission system 204 may include a torque converter 208 and a gear system 230.

The pump 202 may be a hydraulic fracturing pump. For example, the pump 202 may correspond to a fluid pump 108, described herein. The gear system 230 is mechanically coupled to the pump 202. The gear system 230 provides multiple gear ratios (or "gears") to allow driving of the pump 202 at various speeds and torques. The transmission system 204 may be a type of automatic transmission. The engine 206 may be a gaseous fuel engine (e.g., an engine operable by spark ignition of a gaseous fuel). The engine 206 may include a crankshaft (not shown), configured for rotation in the engine 206 to rotate a flywheel (not shown). The engine 206 is configured to drive (e.g., provide power to) the pump 202 via the transmission system 204.

The torque converter 208 (e.g., a fluid coupling device) is configured to fluidly couple the engine 206 and the gear system 230. The torque converter 208 includes an impeller 210 (shown as "I" in FIG. 2), a turbine 212 (shown as "T" in FIG. 2), and a stator 214 (shown as "S" in FIG. 2), positioned between the impeller 210 and the turbine 212, within a housing 216. The housing 216 is filled with a fluid (e.g., transmission fluid). In operation, a toroidal fluid flow circuit is created by the impeller 210, the turbine 212, and the stator 214.

The housing 216 is mechanically coupled to the engine 206. For example, the housing 216 may be mechanically coupled to (e.g., mounted on) the flywheel of the engine 206. The turbine 212 is mechanically coupled to the gear system 230. For example, the turbine 212 may be operatively coupled to an output shaft 218 (which may also be referred to as a "transmission input shaft") that is coupled to the gear system 230.

Operation of the engine 206 rotates the housing 216, and the housing 216 transfers rotational forces to the impeller 210 (e.g., which may be coupled to an interior surface of the housing 216). The impeller 210 includes an array of blades that directs fluid toward the turbine 212 in response to rotation of the impeller 210. The turbine 212 is fluidly coupled to the impeller 210. For example, the turbine 212 is hydrodynamically coupled to the impeller 210 so that rotation of the impeller 210 drives the turbine 212. Thus, fluid pumped by the impeller 210 rotates the turbine 212, thereby transferring torque from the engine 206 to the gear system 230. The turbine 212 also includes an array of blades that directs fluid toward the impeller 210 in response to rotation of the turbine 212. The stator 214, positioned between the impeller 210 and the turbine 212, redirects fluid exiting from the turbine 212 toward the impeller 210. The stator 214 also includes an array of blades configured to control a direction of fluid flow exiting from the turbine 212 to align with a direction of the fluid flow with respect to the impeller 210, which produces a torque multiplication effect when the engine 206 is operating at a low speed (e.g., when a speed of the engine 206 is less than a speed of the pump 202). The stator 214 may be restricted against rotating in an opposite direction of the fluid flow (e.g., via a one-way clutch).

The torque converter includes a lockup clutch 220 and an impeller clutch 222. In some implementations, the gear system 230 and the torque converter 208 (including the lockup clutch 220 and the impeller clutch 222) may be housed together.

The lockup clutch 220 is configured to mechanically couple (e.g., selectively) the engine 206 and the gear system 230 (e.g., via the torque converter 208 without fluid coupling). For example, the lockup clutch 220 may be configured to mechanically couple the turbine 212 to the engine 206. The lockup clutch 220 may be located in the housing 216 (e.g., between the turbine 212 and an interior surface of the housing 216). The lockup clutch 220 may be configured to couple the turbine 212 to the housing 216, such that the housing 216 transfers rotational forces to the turbine 212 during operation of the engine 206. The lockup clutch 220 may be a friction clutch.

The lockup clutch 220 is configured to transition between a disengaged state and an engaged state (e.g., by hydraulic control of the lockup clutch 220). The lockup clutch 220 may be slipped (e.g., partially engaged) when transitioning between engagement and disengagement or between disengagement and engagement. Disengagement of the lockup clutch 220 results in fluid coupling of the engine 206 and the gear system 230 via the torque converter 208. Engagement of the lockup clutch results in mechanical coupling of the engine 206 and the gear system 230 via the torque converter 208. The lockup clutch 220 may be engaged when a speed of the turbine 212 corresponds to (e.g., is substantially the same as) a speed of the impeller 210. Mechanical coupling of the engine 206 and the gear system 230 more efficiently transfers power from the engine 206 to the gear system 230 relative to fluid coupling.

The impeller clutch 222 may be configured to mechanically couple (e.g., selectively) the impeller 210 to the engine 206. The impeller clutch 222 may be located in the housing 216 (e.g., between the impeller 210 and an interior surface of the housing 216). The impeller clutch 222 may be configured to couple the impeller 210 to the housing 216, such that the housing 216 transfers rotational forces to the impeller 210 during operation of the engine 206. The impeller clutch 222 may be a friction clutch. In some implementations, the impeller clutch 222 may include a disc stack of alternating friction discs and separator plates. A piston plate may be positioned on an end of the disc stack. One or more actuators (e.g., hydraulically actuated pistons) may be configured to engage the piston plate to compress the disc stack.

The impeller clutch 222 is configured to transition between a disengaged state and an engaged state (e.g., by hydraulic control of the impeller clutch 222). The impeller clutch 222 may be slipped (e.g., partially engaged) when transitioning between engagement and disengagement or between disengagement and engagement. For example, the impeller clutch 222 may be slipped for a period of time that is based on a size, a material, and/or a number of discs of the impeller clutch 222 and/or based on a speed and torque of the engine 206. Disengagement of the impeller clutch 222 results in decoupling of the engine 206 and the gear system 230 (e.g., decoupling of the engine 206 and the impeller 210). Engagement of the impeller clutch 222 results in fluid coupling of the engine 206 and the gear system 230 via the torque converter 208 (e.g., coupling of the engine 206 and the impeller 210). Slipping the impeller clutch 222 gradually engages or disengages the engine 206 from the pump 202, thereby spreading a load change over a longer period of time and reducing a load rise rate at the engine 206.

The pump system 200 may include a controller 224. The controller 224 may include one or more electronic control modules (ECMs) associated with the engine 206, the transmission system 204, the gear system 230, and/or the torque converter 208. For example, the controller 224 may be associated with the transmission system 204, as shown. The controller 224 may correspond to the controller 130, described herein. Moreover, the transmission system 204 may include a gear system control 232 for the gear system 230, and the pump system 200 may include an engine control 234 for the engine 206. The gear system control 232 and the engine control 234 may be communicatively coupled with the controller 224.

The controller 224 may include one or more memories and one or more processors communicatively coupled to the one or more memories. A processor may include a central processing unit, a graphics processing unit, a microprocessor, a controller, a microcontroller, a digital signal processor, a field-programmable gate array, an application-specific integrated circuit, and/or another type of processing component. The processor may be implemented in hardware, firmware, or a combination of hardware and software. The processor may be capable of being programmed to perform one or more operations or processes described elsewhere herein. A memory may include volatile and/or nonvolatile memory. For example, the memory may include random access memory (RAM), read only memory (ROM), a hard disk drive, and/or another type of memory (e.g., a flash memory, a magnetic memory, and/or an optical memory). The memory may store information, one or more instructions, and/or software (e.g., one or more software applications) related to the operation of the controller 224.

The controller 224 may be configured to control engagement and disengagement of the lockup clutch 220 and/or the impeller clutch 222. For example, the controller 224 may control engagement and disengagement of the lockup clutch 220 and/or the impeller clutch 222 in connection with a gear shift of the gear system 230. The controller 224 may control engagement and disengagement of the lockup clutch 220 via a first clutch control 226 and/or the controller 224 may control engagement and disengagement of the impeller clutch 222 via a second clutch control 228. The clutch controls 226, 228 may include hydraulic actuators, valves, or the like. For example, the clutch controls 226, 228 may include electronic clutch pressure controls (ECPCs).

The controller 224 may detect that an upshift of the gear system 230 is to be performed (e.g., based on a current gearshift status at the gear system 230). For example, the controller 224 may receive a request to perform the upshift (e.g., from an engine ECM) or the controller 224 may determine to perform the upshift. The upshift may be a shift into first gear (e.g., from neutral into first gear), which may be associated with a large load step. Alternatively, the upshift may be a shift from a lower gear to a higher gear (e.g., a skip shift from the lower gear to the higher gear that skips one or more intermediate gears between the lower gear and the higher gear). In a similar manner as described above, the controller 224 may detect that a downshift of the gear system 230 is to be performed.

Based on detection of the upshift (or in some cases, the downshift), the controller 224 may determine whether to disengage (e.g., to drop) the impeller clutch 222. Based on determining to disengage the impeller clutch 222, the controller 224 may cause disengagement of the impeller clutch 222 prior to the upshift. The controller 224 may determine to disengage the impeller clutch 222 based on an estimate (e.g., a prediction) of a load step attributable to the upshift (e.g., based on the estimate of the load step satisfying a threshold). For example, the controller 224 may cause disengagement of the impeller clutch 222 based on an auxiliary load, a current powertrain load, a flow rate of the pump 202, a pressure of the pump 202, and/or a future (e.g., anticipated) powertrain load (e.g., due to the upshift). As an example, the controller 224 may cause disengagement of the impeller clutch 222 when the upshift is a shift into first gear or a skip shift. By disengaging the impeller clutch 222, an impact to the engine 206 with respect to the changing load can be minimized. The controller 224 may cause disengagement of the impeller clutch 222 at a disengagement rate (e.g., corresponding to disengagement of the impeller clutch 222 over a particular time period). For example, the controller 224 may cause slipping of the impeller clutch 222 over a time period to disengage the impeller clutch 222. The disengagement rate may be based on a status of a load on the engine 206 (e.g., a load on the engine 206 from the pump 202 and the transmission system 204) and/or a speed of the engine 206. The controller 224 may control the disengagement rate directly or via control of a pressure change rate.

In some examples, the controller 224 may determine that the impeller clutch 222 is not to be disengaged (e.g., the impeller clutch 222 is to remain engaged). Accordingly, the controller 224 may cause the upshift (or in some cases, the downshift) of the gear system 230 with the impeller clutch 222 engaged. For example, with the impeller clutch 222 engaged, the controller 224 may cause disengagement of the lockup clutch 220 prior to the gear shift, cause the gear shift to be performed, and then cause engagement of the lockup clutch 220 (e.g., once a speed of the turbine 212 corresponds to a speed of the impeller 210). In other examples, the controller 224 may cause the gear shift to be performed while the lockup clutch 220 remains engaged.

In some implementations, based on detection of the upshift (or in some cases, the downshift), the controller 224 may cause disengagement of the lockup clutch 220 (e.g., if the lockup clutch 220 is currently engaged). The controller 224 may cause disengagement of the lockup clutch 220 prior to the upshift and based on determining to disengage the impeller clutch 222 (e.g., if the controller 224 determines to disengage the impeller clutch 222, then the controller 224 may cause disengagement of the impeller clutch 222 and the lockup clutch 220). The controller 224 may cause disengagement of the lockup clutch 220 after, before, or concurrently with disengagement of the impeller clutch 222.

The controller 224 may cause disengagement of the lockup clutch 220 at a disengagement rate (e.g., corresponding to disengagement of the lockup clutch 220 over a particular time period). For example, the controller 224 may cause slipping of the lockup clutch 220 over a time period to disengage the lockup clutch 220. The disengagement rate may be based on a status of a load on the engine 206 and/or a speed of the engine 206, in a similar manner as described above. The controller 224 may control the disengagement rate directly or via control of a pressure change rate.

Based on disengagement of at least the impeller clutch 222 (e.g., disengagement of the impeller clutch 222 and disengagement of the lockup clutch 220), the controller 224 may cause the upshift (or in some cases, the downshift) of the gear system 230. For example, the controller 224 may cause the upshift of the gear system 230 by transmitting a control signal to cause engagement of a gear of the gear system 230 (e.g., the control signal may cause pressurization of a clutch associated with the gear).

After performing the upshift (or the downshift), the controller 224 may cause engagement of the impeller clutch 222. The controller 224 may cause engagement of the impeller clutch 222 at an engagement rate (e.g., corresponding to engagement of the impeller clutch 222 over a particular time period). For example, the controller 224 may cause slipping of the impeller clutch 222 over a time period to engage the impeller clutch 222. As an example, the time period, such as 10 seconds, may be much greater than a time needed to perform the upshift. The engagement rate may be based on a load on the engine 206 and/or a speed droop of the engine 206 (e.g., due to increasing the load). For example, to engage the impeller clutch 222, the controller 224 may monitor the load and/or the speed droop, and the engagement rate may be based on the load and/or the speed droop. As an example, the controller 224 may cause slipping of the impeller clutch 222 at the engagement rate until satisfying the load on the engine 206. In other words, if the speed droop of the engine 206 satisfies a threshold value (e.g., meets or exceeds the threshold value), engagement of the impeller clutch 222 may be delayed (e.g., by lowering the engagement rate) until the speed droop does not satisfy the threshold value (e.g., speed droop below the threshold value). For example, as the engagement rate is decreased, or lowered, delay in engaging of the impeller clutch 222 is increased, and as the engagement rate is increased, or raised, delay in engaging of the impeller clutch 222 is decreased. Accordingly, the controller 224 may manipulate the engagement rate (e.g., by decreasing and/or increasing the engagement rate) to achieve a particular delay in engagement of the impeller clutch 222 (e.g., based on how speed droop is responding as the impeller clutch 222 is partially engaged). The controller 224 may control the engagement rate directly or via control of a pressure change rate. Disengaging and subsequently engaging the impeller clutch 222 in connection with the upshift facilitates improved load acceptance by the engine 206, which otherwise would exhibit poor load acceptance resulting in substantial loss of speed.

In some implementations, the controller 224 may monitor whether the pump system 200 is stabilized (e.g., whether the engine 206, a powertrain load, a load of the pump 202, or the like, is stabilized). For example, the controller 224 may monitor whether the engine 206 is stabilized. The controller 224 may monitor whether the pump system 200 is stabilized (e.g., whether the engine 206 is stabilized) based on an auxiliary load, a current powertrain load, a flow rate of the pump 202, a pressure of the pump 202, a speed of the engine 206, and/or a torque of the engine 206. Based on a determination that the engine 206 is not stabilized (after performing the upshift), the controller may cause engagement of the impeller clutch 222. Engagement of the impeller clutch 222 may apply load from the pump system 200 to the engine 206 to cause the engine 206 to be stabilized. Based on a determination that the pump system 200 is stabilized (after performing the upshift), the controller may cause engagement of the impeller clutch 222.

In some implementations, after the upshift (or the downshift) and after engagement of the impeller clutch 222, the controller 224 may cause engagement of the lockup clutch 220 (e.g., once a speed of the turbine 212 corresponds to a speed of the impeller 210). The controller 224 may cause engagement of the lockup clutch 220 at an engagement rate (e.g., corresponding to engagement of the lockup clutch 220 over a particular time period). For example, the controller 224 may cause slipping of the lockup clutch 220 over a time period, such as 20 seconds, to engage the lockup clutch 220. The engagement rate may be based on a powertrain load and/or a load of the pump 202. For example, to engage the lockup clutch 220, the controller 224 may monitor the powertrain load and/or the load of the pump 202, and the engagement rate may be based on the powertrain load and/or the load. As an example, the controller 224 may cause slipping of the lockup clutch 220 at the engagement rate until satisfying the powertrain load and/or the load of the pump 202. The controller 224 may control the engagement rate directly or via control of a pressure change rate.

A first time duration for disengagement of the impeller clutch 222 may be less than a second time duration for disengagement of the lockup clutch 220. For example, the controller 224 may cause disengagement of the impeller clutch 222 before causing disengagement of the lockup clutch 220, and the controller 224 may cause re-engagement of the impeller clutch 222 before causing re-engagement of the lockup clutch 220.

As indicated above, FIG. 2 is provided as an example. Other examples may differ from what is described with regard to FIG. 2.

Figure 3:
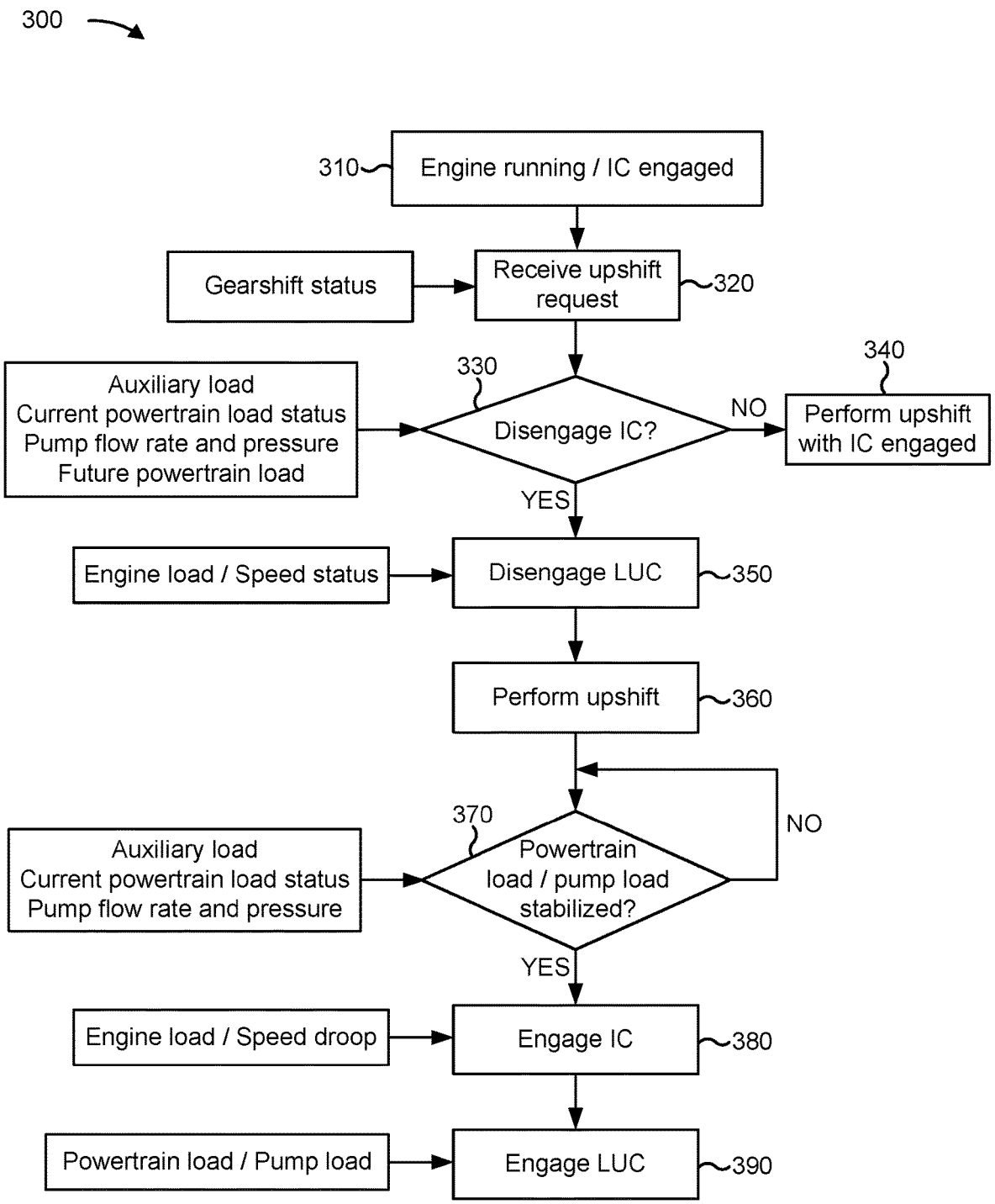
FIG. 3 is a flowchart of an example process associated with control of an impeller clutch of a torque converter for a gaseous fuel engine.

FIG. 3 is a flowchart of an example process 300 associated with control of an impeller clutch of a torque converter for a gaseous fuel engine. One or more process blocks of FIG. 3 may be performed by the controller 224. For example, the controller 224 may be a transmission ECM. In some examples, one or more process blocks of FIG. 3 may be performed by the transmission system 204.

Process 300 may begin when the engine 206 is running and the impeller clutch 222 (shown in FIG. 3 as "IC") is engaged (block 310). In some examples, the lockup clutch 220 (shown in FIG. 3 as "LUC") may also be engaged. Process 300 may include receiving an upshift request (block 320). The controller 224 may determine that an upshift request is received and/or determine a higher gear in which to shift based on one or more inputs, such as a gearshift status, as described herein.

Process 300 may include determining whether to disengage the impeller clutch 222 (block 330). For example, the controller 224 may determine whether to disengage the impeller clutch 222 based on one or more inputs, such as an auxiliary load, a current powertrain load, a flow rate of the pump 202, a pressure of the pump 202, and/or a future (e.g., anticipated) powertrain load, as described herein. Based on a determination that the impeller clutch 222 is not to be disengaged (block 330—NO), process 300 may include causing the upshift to be performed with the impeller clutch 222 engaged (block 340). For example, with the impeller clutch 222 engaged, the controller 224 may cause disengagement of the lockup clutch 220 prior to the upshift and then cause the upshift to be performed, as described herein. Based on a determination that the impeller clutch 222 is to be disengaged (block 330—YES), the controller 224 may cause the impeller clutch 222 to be disengaged, and process 300 may include causing the lockup clutch 220 to be disengaged (block 350). The controller 224 may determine disengagement rates for the impeller clutch 222 and the lockup clutch 220 based on one or more inputs, such as status of an engine load and/or speed, as described herein. Process 300 may include causing the upshift to be performed (block 360).

Process 300 may include determining whether a powertrain or pump load is stabilized (block 370). For example, the controller 224 may determine whether the powertrain or pump load is stabilized based on one or more inputs, such as an auxiliary load, a current powertrain load, a flow rate of the pump 202, and/or a pressure of the pump 202, as described herein. Based on a determination that the powertrain or pump load is not stabilized (block 370—NO), process 300 may include returning to block 370 (e.g., the controller 224 may wait to proceed until the powertrain or pump load is stabilized). Based on a determination that the powertrain or pump load is stabilized (block 370—YES), process 300 may include causing engagement of the impeller clutch 222 (block 380). The controller may cause engagement of the impeller clutch 222 at an engagement rate based on one or more inputs, such as an engine load and/or an engine speed droop, as described herein. Process 300 may include causing engagement of the lockup clutch 220 (block 390). The controller may cause engagement of the lockup clutch 220 at an engagement rate based on one or more inputs, such as a powertrain or pump load, as described herein.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The torque converter described herein may be used with any powertrain that includes a gaseous fuel engine. For example, the torque converter may be used to couple a gaseous fuel engine with a gear system to drive a hydraulic fracturing pump. Gaseous fuel engines are typically associated with poor load acceptance or otherwise poor response to changes in load. Accordingly, a gaseous fuel engine generally has been considered unsuitable for driving a hydraulic fracturing pump because of the high load rise rates associated with hydraulic fracturing operations due to gear shifts or due to a hydraulic fracturing pump being brought online in the middle of a fracturing stage.

The torque converter described herein includes an impeller clutch that enables an impeller of the torque converter to be selectively coupled to the gaseous fuel engine. This is useful for gear shifts of the gear system, such as upshifts, associated with a large load step. In particular, the impeller clutch may be disengaged prior to an upshift of the gear system, and slowly re-engaged after the upshift is performed, to minimize an impact to the gaseous fuel engine with respect to the changing load. In this way, the impeller clutch of the torque converter facilitates improved load acceptance by the gaseous fuel engine, thereby enabling use of the gaseous fuel engine in hydraulic fracturing applications associated with high load rise rates. By using the gaseous fuel engine, compared to a diesel engine or a diesel/natural gas dual-fuel engine conventionally used for hydraulic fracturing applications, greenhouse gas emissions and fuel costs may be reduced.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A hydraulic fracturing pump system, comprising:
   a hydraulic fracturing pump;
   a gaseous fuel engine configured to drive the hydraulic fracturing pump;
   a transmission system comprising a gear system mechanically coupled to the hydraulic fracturing pump and a torque converter configured to fluidly couple the gaseous fuel engine and the gear system, the torque converter comprising:
      an impeller;
      a turbine fluidly coupled to the impeller and mechanically coupled to the gear system;
      a stator positioned between the impeller and the turbine;
      an impeller clutch configured to mechanically couple the impeller to the gaseous fuel engine; and
      a lockup clutch configured to mechanically couple the gaseous fuel engine and the gear system; and
   a controller configured to:
      cause disengagement of the impeller clutch; and
      cause an upshift of the gear system based on disengagement of the impeller clutch.

2. The hydraulic fracturing pump system of claim 1, wherein the impeller, the turbine, and the stator are within a housing of the torque converter that is coupled to the gaseous fuel engine.

3. The hydraulic fracturing pump system of claim 2, wherein the impeller clutch is configured to couple the impeller to the housing, and the lockup clutch is configured to couple the turbine to the housing.

4. The hydraulic fracturing pump system of claim 1, wherein the controller is further configured to:
   detect that the upshift of the gear system is to be performed,
      wherein, to cause disengagement of the impeller clutch, the controller is configured to:
         cause disengagement of the impeller clutch based on detecting that the upshift of the gear system is to be performed.

5. The hydraulic fracturing pump system of claim 1, wherein the upshift is a shift into first gear.

6. The hydraulic fracturing pump system of claim 1, wherein the controller, to cause disengagement of the impeller clutch, is configured to:
   cause disengagement of the impeller clutch at a disengagement rate that is based on a status of at least one of a load on the gaseous fuel engine, from the hydraulic fracturing pump and the transmission system, or a speed of the gaseous fuel engine.

7. The hydraulic fracturing pump system of claim 1, wherein the controller is further configured to:
   cause engagement of the impeller clutch after the upshift of the gear system.

8. The hydraulic fracturing pump system of claim 7, wherein the controller, to cause engagement of the impeller clutch, is configured to:
   monitor whether the gaseous fuel engine is stabilized; and
   cause engagement of the impeller clutch further based on a determination that the gaseous fuel engine is not stabilized,
      wherein engagement of the impeller clutch is configured to apply load from the hydraulic fracturing pump system to the gaseous fuel engine to cause the gaseous fuel engine to be stabilized.

9. The hydraulic fracturing pump system of claim 1, wherein the controller is further configured to:
   cause disengagement of the lockup clutch prior to causing the upshift of the gear system; and
   cause engagement of the lockup clutch after the upshift of the gear system and engagement of the impeller clutch.

10. A transmission system, comprising:
    a gear system configured to couple to a hydraulic fracturing pump; and
    a torque converter configured to fluidly couple a gaseous fuel engine and the gear system, the torque converter comprising:
       an impeller;
       a turbine fluidly coupled to the impeller and mechanically coupled to the gear system;
       a stator positioned between the impeller and the turbine;
       an impeller clutch configured to mechanically couple the impeller to the gaseous fuel engine; and
       a lockup clutch configured to mechanically couple the gaseous fuel engine and the gear system; and
    a controller configured to:
       cause disengagement of the impeller clutch; and
       cause an upshift of the gear system based on disengagement of the impeller clutch.

11. The transmission system of claim 10, wherein the controller is further configured to:
    cause disengagement of the lockup clutch prior to the upshift of the gear system.

12. The transmission system of claim 11, wherein a first time duration for disengagement of the impeller clutch is less than a second time duration for disengagement of the lockup clutch.

13. The transmission system of claim 11, wherein the controller, to cause disengagement of the lockup clutch, is configured to:
    cause disengagement of the lockup clutch at a disengagement rate that is based on a status of at least one of a load on the gaseous fuel engine or a speed of the gaseous fuel engine.

14. The transmission system of claim 11, wherein the controller, to cause engagement of the lockup clutch, is configured to:

cause engagement of the lockup clutch at an engagement rate that is based on a load of the hydraulic fracturing pump.

15. The transmission system of claim 10, wherein the upshift is a shift into first gear.

16. A torque converter to fluidly couple a gaseous fuel engine and a gear system mechanically coupled to a hydraulic fracturing pump, the torque converter comprising:
an impeller;
a turbine fluidly coupled to the impeller;
a stator positioned between the impeller and the turbine;
an impeller clutch configured to couple the impeller to the gaseous fuel engine; and
a lockup clutch configured to mechanically couple the gaseous fuel engine and the gear system; and
a controller configured to:
cause disengagement of the impeller clutch; and
cause an upshift of the gear system based on disengagement of the impeller clutch.

17. The torque converter of claim 16, further comprising:
a first clutch control configured to control engagement and disengagement of the lockup clutch; and
a second clutch control configured to control engagement and disengagement of the impeller clutch.

18. The torque converter of claim 16, wherein the impeller, the turbine, and the stator are within a housing of the torque converter that is coupled to the gaseous fuel engine.

19. The torque converter of claim 18, wherein the impeller clutch is configured to couple the impeller to the housing, and the lockup clutch is configured to couple the turbine to the housing.

20. The torque converter of claim 16, wherein the controller is further configured to:
cause disengagement of the lockup clutch prior to the upshift of the gear system.

* * * * *